(12) United States Patent
Singh et al.

(10) Patent No.: US 8,224,320 B1
(45) Date of Patent: Jul. 17, 2012

(54) USING RF CONDITIONS AND HANDOFF STATE TO DYNAMICALLY ADJUST A SEARCH WINDOW SIZE

(75) Inventors: Jasinder P. Singh, Olathe, KS (US); Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 497 days.

(21) Appl. No.: 12/547,150

(22) Filed: Aug. 25, 2009

(51) Int. Cl.
*H04W 4/00* (2009.01)

(52) U.S. Cl. ........ 455/434; 455/436; 455/437; 455/442; 455/515; 370/331; 370/335; 370/342

(58) Field of Classification Search .................. 455/434
See application file for complete search history.

(56) References Cited

U.S. PATENT DOCUMENTS

| | | | |
|---|---|---|---|
| 5,726,982 A | 3/1998 | Witter | |
| 6,445,728 B1 | 9/2002 | Byun | |
| 6,775,252 B1 | 8/2004 | Bayley | |
| 6,940,838 B1 * | 9/2005 | Stead | 370/335 |
| 7,123,913 B2 | 10/2006 | Akao et al. | |
| 7,194,020 B1 | 3/2007 | Farag et al. | |
| 7,236,796 B2 | 6/2007 | Soliman | |
| 7,392,045 B2 | 6/2008 | Ben-Eli | |
| 7,623,861 B2 * | 11/2009 | Joshi et al. | 455/436 |
| 2003/0086512 A1 * | 5/2003 | Rick et al. | 375/343 |
| 2003/0125060 A1 * | 7/2003 | Kim et al. | 455/509 |
| 2003/0134652 A1 * | 7/2003 | Ben-Eli | 455/515 |
| 2003/0176189 A1 * | 9/2003 | Merson et al. | 455/436 |
| 2007/0009065 A1 | 1/2007 | Kuo et al. | |

* cited by examiner

*Primary Examiner* — Charles Appiah
*Assistant Examiner* — Mazda Sabouri (57) ABSTRACT

Methods and apparatus are provided for dynamically adjusting a search-window size. An active-call state is entered into, and a mobile station is responsively initially operated according to a default-search-window mode. The preferred-signal strength as received at the mobile station, the preferred-signal fading of the mobile station, and the number of sectors in an active set for the mobile station are monitored to: compare the preferred-signal strength to a signal-strength threshold, compare the preferred-signal fading to at least one of a lower-fading threshold and an upper-fading threshold, and determine whether the number of sectors in the active set is exactly one sector or more than one sector. The mobile station is selectively operated in one of the default-search-window mode, a reduced-search-window mode, and an increased-search-window mode in response to the monitored preferred-signal strength, preferred-signal fading, and number of sectors in the active set.

20 Claims, 5 Drawing Sheets

USING RF CONDITIONS AND HANDOFF STATE TO DYNAMICALLY ADJUST A SEARCH WINDOW SIZE

BACKGROUND

Many people use mobile stations, such as cell phones and personal digital assistants (PDAs), to communicate with cellular wireless networks. These mobile stations and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a mobile station is positioned in a sector, it can communicate over the RF air interface with the base station, and, in turn, over one or more circuit-switched and/or packet-switched signaling and/or transport networks to which the base station provides access. The base station and the mobile station conduct these communications over a frequency known as a carrier. Note that base stations may provide service in a sector on one carrier, or on more than one, and further that a given instance of a given carrier in a given sector may be referred to herein as a "sector/carrier."

In general, a pilot channel functions to alert mobile stations in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. Mobile stations generally use the pilot channel to coherently detect and demodulate the signal on a sector/carrier.

In a typical wireless network, a mobile station can communicate with a number of "active" sectors or coverage areas at a time, typically known as the "active set" for that mobile station. Depending on the system, the number of active sectors can be up to three or six (currently), as examples. The mobile station receives substantially the same information from each of the coverage areas in the active set and, on a frame-by-frame basis, selects the best signal to use. The mobile station, one or more base stations, and/or a base station controller maintains in memory a list of the coverage areas in the mobile station's active set.

In existing systems, to facilitate a determination of which sectors should be in the mobile station's active set, all base stations emit the pilot channel signal, typically at a power level higher than other forward-link signals. A mobile station constantly measures the strength of each pilot that it receives, and notifies at least one base station when pilot strength for various coverage areas falls above or below designated thresholds. The base station, may, in turn, provide the mobile station with an updated list of active pilot signals (i.e. an updated active set).

In a CDMA system configured as above, a link from the base station to the mobile station is called a forward link and a link from the mobile station to the base transceiver station is called a reverse link. All forward links from a base station have the same PN offset. The PN offset is transmitted via the pilot channel signal, as one of the forward channels. A mobile station continuously monitors the pilot channel signal in order to obtain a good quality signal on the forward channel. A mobile station located within the service coverage of the base station uses the pilot signal for synchronization. A mobile station can acquire the timing of the forward CDMA channel from the pilot signal and obtain the phase reference for coherent demodulation.

The mobile station can simultaneously communicate with a plurality of base stations while differentiating the code. The above function is known as a soft handoff. That is, each of the base stations transmits a pilot signal having its own PN offset, so the mobile station searches for the timing location from which the strongest pilot signals are received. After the mobile station receives the pilot signal from the base station, the base station continues to instruct the mobile station to search for transmitted pilot signals from other base stations, as well as using a particular timing location for each base station.

At this time, the base station provides the mobile station with a search window to search for the pilot signals. A search window is the amount of time, in terms of chips, that a mobile station will search for a pilot channel, where a chip is the unit of code spreading for CDMA (one chip is approximately 0.8 µs in duration). When the mobile station is initially connected to the base station, the base station transmits a search-window size corresponding to the active set, to the mobile station.

Overview

In wireless telecommunications, multipath is the term for the propagation phenomenon that results in radio signals reaching a receiving antenna by two or more paths. Causes of multipath include atmospheric ducting, ionospheric reflection and refraction, and reflection from water bodies and terrestrial objects such as mountains and buildings, which can vary throughout a sector. The effects of multipath include constructive and destructive interference, as well as phase shifting of the signal.

The inventors of the presently disclosed methods and apparatus have recognized that conventional methods for adjusting a search-window size do not always account for the different radio frequency conditions and handoff state that different mobile stations can experience in the same sector. For example, one mobile station may be receiving a signal via a direct unobstructed energy path that requires a smaller search-window size, while another mobile station may be surrounded by buildings creating a high multipath environment that requires a larger search-window size.

To address the limitations of conventional search-window size adjustments, disclosed herein are methods and apparatus for dynamically adjusting a search-window size. For example, search-window size may be adjusted based on a preferred-signal strength, a preferred-signal fading, and the number of sectors in the active set. So various search-window sizes may be employed by different mobile stations in the same coverage area based on the specific RF conditions and handoff state experienced by each mobile station, in order to optimize the signal quality on the forward link channel.

BRIEF DESCRIPTION OF DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture

Figure 1:
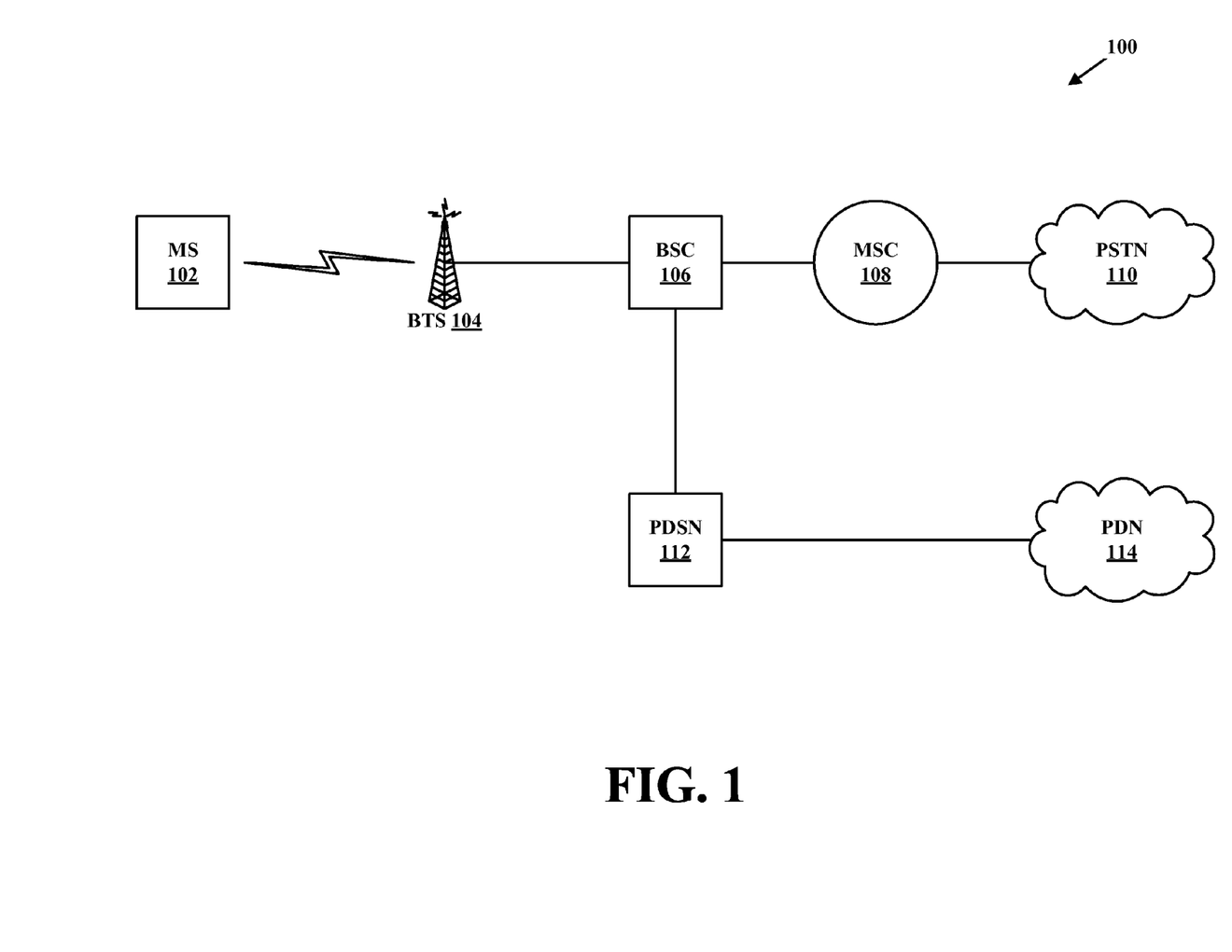
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108, etc.; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, MS 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA (and/or other protocol) coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

2. Exemplary Operation

Figure 2:
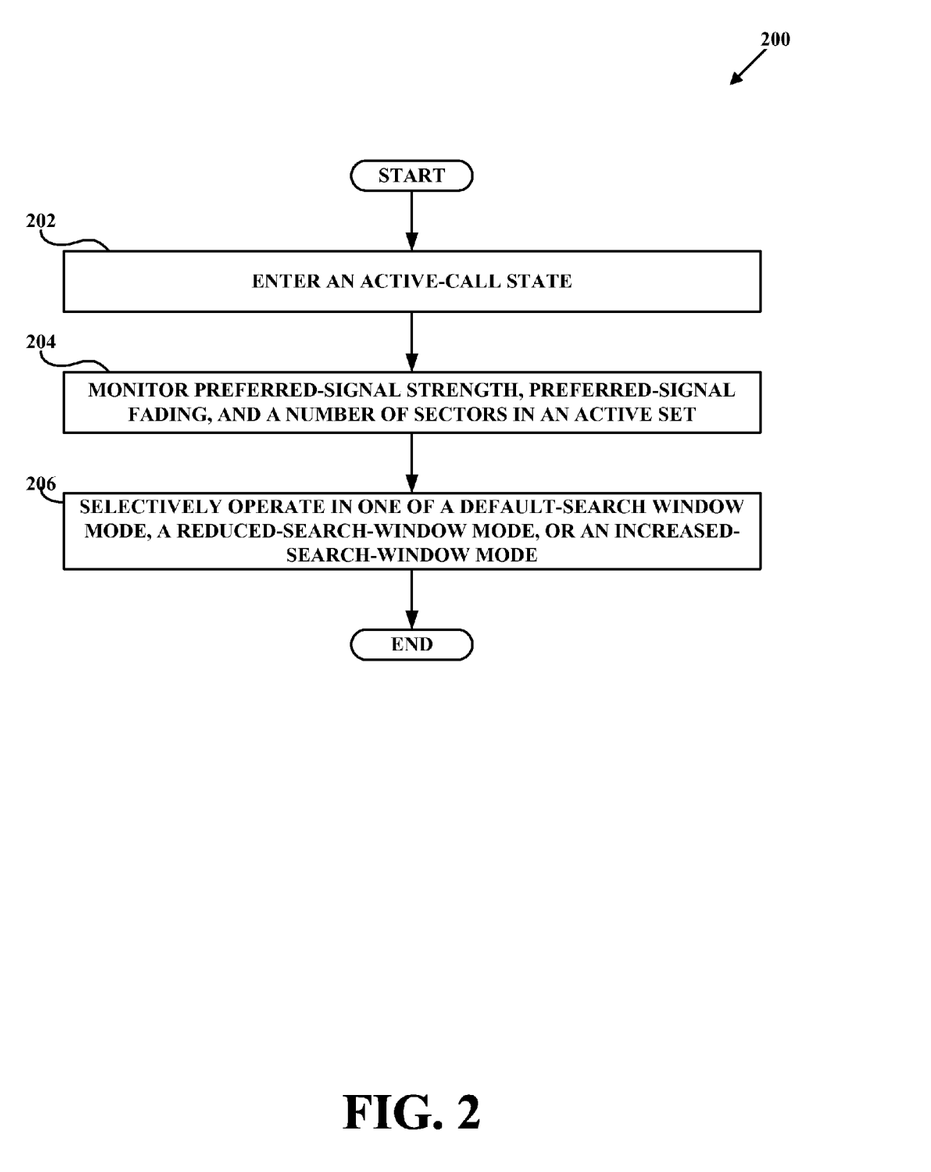
FIG. 2 is a flowchart of a method, in accordance with exemplary embodiments.

FIG. 2 depicts a flowchart of a method 200 for dynamically adjusting a search-window size for a mobile station, in accordance with exemplary embodiments. As shown in FIG. 2, method 200 begins at step 202, MS 102 enters an active-call state and responsively initially operates the MS 102 according to a default-search-window mode. At step 204, the MS 102 monitors the preferred-signal strength as received at the mobile station 102, the preferred-signal fading of the mobile station, and the number of sectors in an active set for the MS 102 to: (i) compare the preferred-signal strength to a signal-strength threshold, (ii) compare the preferred-signal fading to at least one of a lower-fading threshold and an upper-fading threshold, and (iii) determine whether the number of sectors in the active set is exactly one sector or more than one sector. At step 206, the mobile station 102 selectively operates the MS 102 in one of the default-search-window mode, a reduced-search-window mode, and an increased-search-window mode in response to the monitored preferred-signal strength, preferred-signal fading, and number of sectors in the active set.

The default-search-window mode comprises operating with a default-search-window size, whereas the reduced-search-window mode operates with a reduced-search-window size that is less than the default-search-window size, while the increased-search-window mode operates with an increased-search-window size that is greater than the default-search-window size. The default-, reduced-, and increased-search-window sizes are preferably in the range of 2 to 452 chips. In addition, the reduced-search-window mode is employed in response to a determination that (i) the preferred-signal strength exceeds the signal-strength threshold, (ii) the preferred-signal fading is less than the lower-fading threshold, and (iii) there is exactly one sector in the active set. And the increased-search-window mode is employed in response to a determination that (i) the preferred-signal fading is greater than the upper-fading threshold and (ii) there is more than one sector in the active set.

Note that method 200 is described herein as being carried out by MS 102. This, however, is not required. In general, method 200 can be carried out by any one or any combination of the MS 102, BTS 104, BSC 106, MSC 108, PDSN 110, a device known as a radio network controller, a device known as an access node, a computer, a server, another network entity, and any combination thereof. In addition, method 200 is preferably carried out repeatedly on a periodic basis, preferably every 5 to 10 s, so as to dynamically adjust search-window size in response to the monitored preferred-signal strength, preferred-signal fading, and number of sectors in the active set.

As used herein, the preferred-signal strength may correspond to the pilot channel with the strongest power level in the mobile station's active set. The pilot-channel power level is referred to as "$E_c$"—"energy per chip." $E_c$ can be expressed in Watts (W), milliwatts (mW), or any other suitable units of measure. Note that $E_c$ is often expressed as a base-10 logarithmic ratio, with respect to a reference power level of 1 mW. In that case, $E_c$ would typically be expressed using the unit "dBm," where "dB" indicates decibels and "m" indicates the reference power level. So, $E_c$ can be expressed as the base-10 logarithmic ratio of the pilot-channel power level (in mW) and 1 mW. As used herein, the signal-strength threshold is preferably in a range of −65 to −50 dBm.

In CDMA networks, data is transmitted from the BTS 104 to the MS 102 (and vice versa) in data units that are known as frames, which typically last 20 ms. As used herein, the preferred-signal fading is measured as the standard deviation of the preferred-signal strength as received at the MS 102 over the last "X" frames, where "X" is preferably in the range of 2 to 30 frames. The lower-fading threshold is preferably in a range of 2 to 3 dBm, while the upper-fading threshold is preferably in a range between 5 to 6 dBm.

Figure 3:
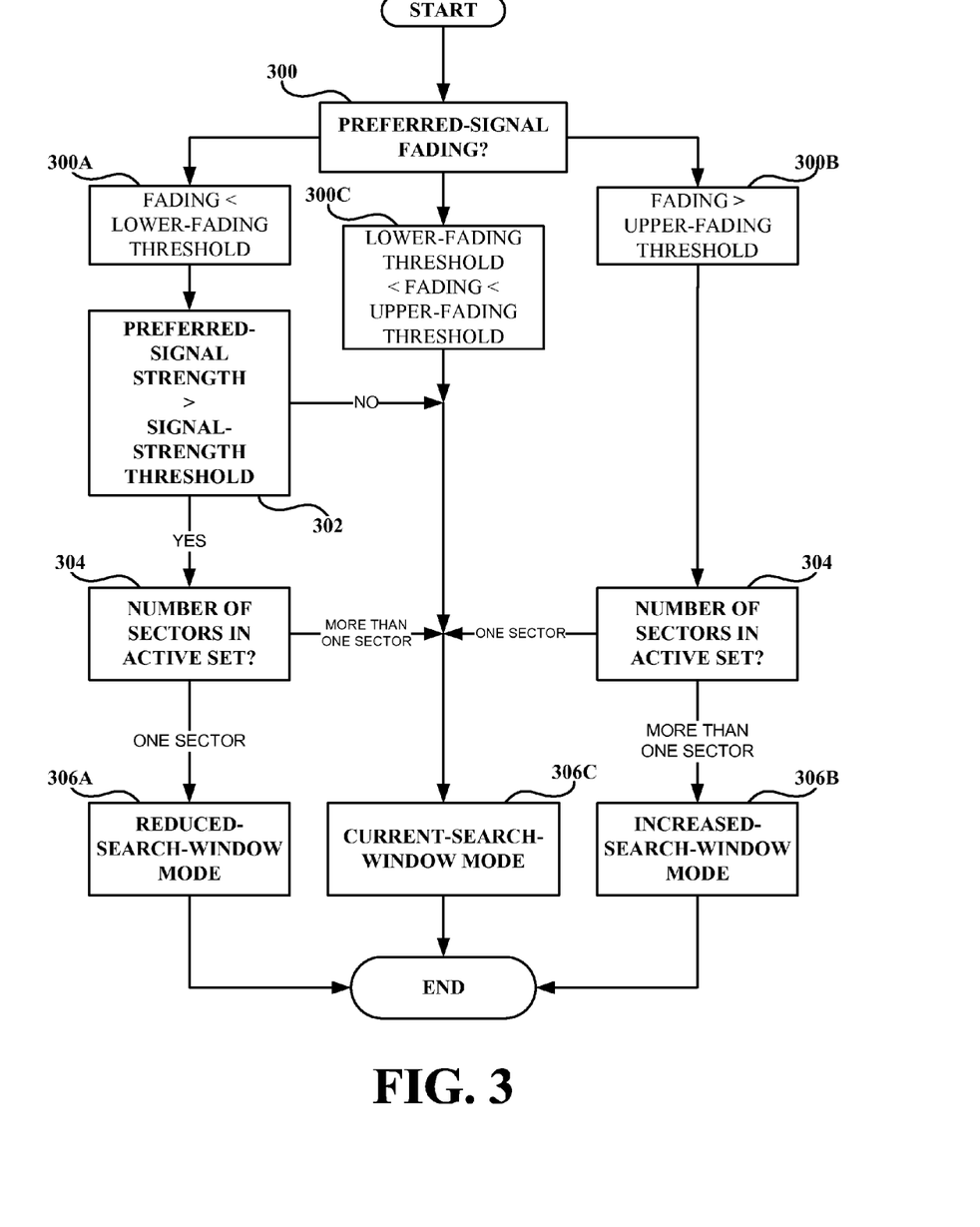
FIG. 3 is a flow chart depicting functions that can be carried out in accordance with an embodiment of the invention.
Figure 4:
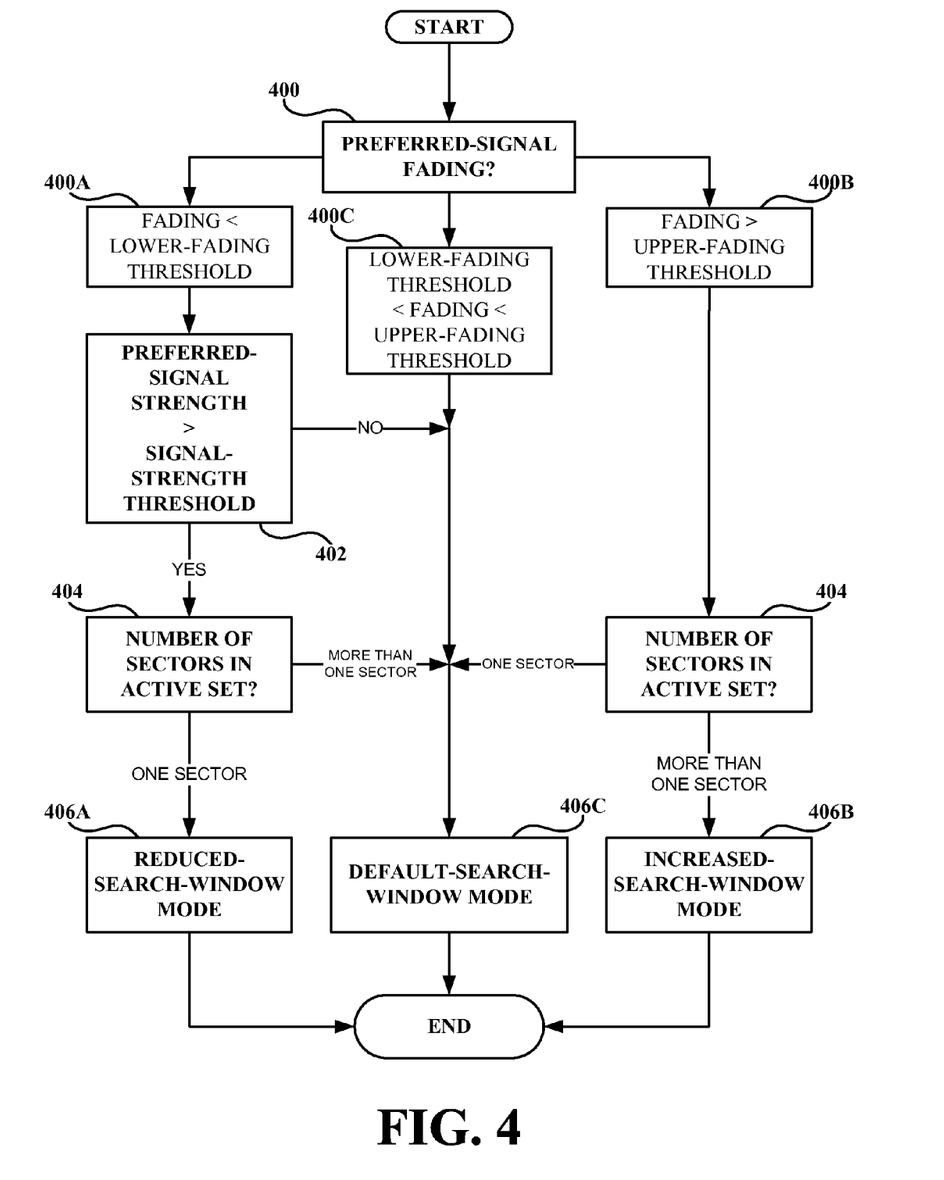
FIG. 4 is a flow chart depicting functions that can be carried out in accordance with an embodiment of the invention.
Figure 5:
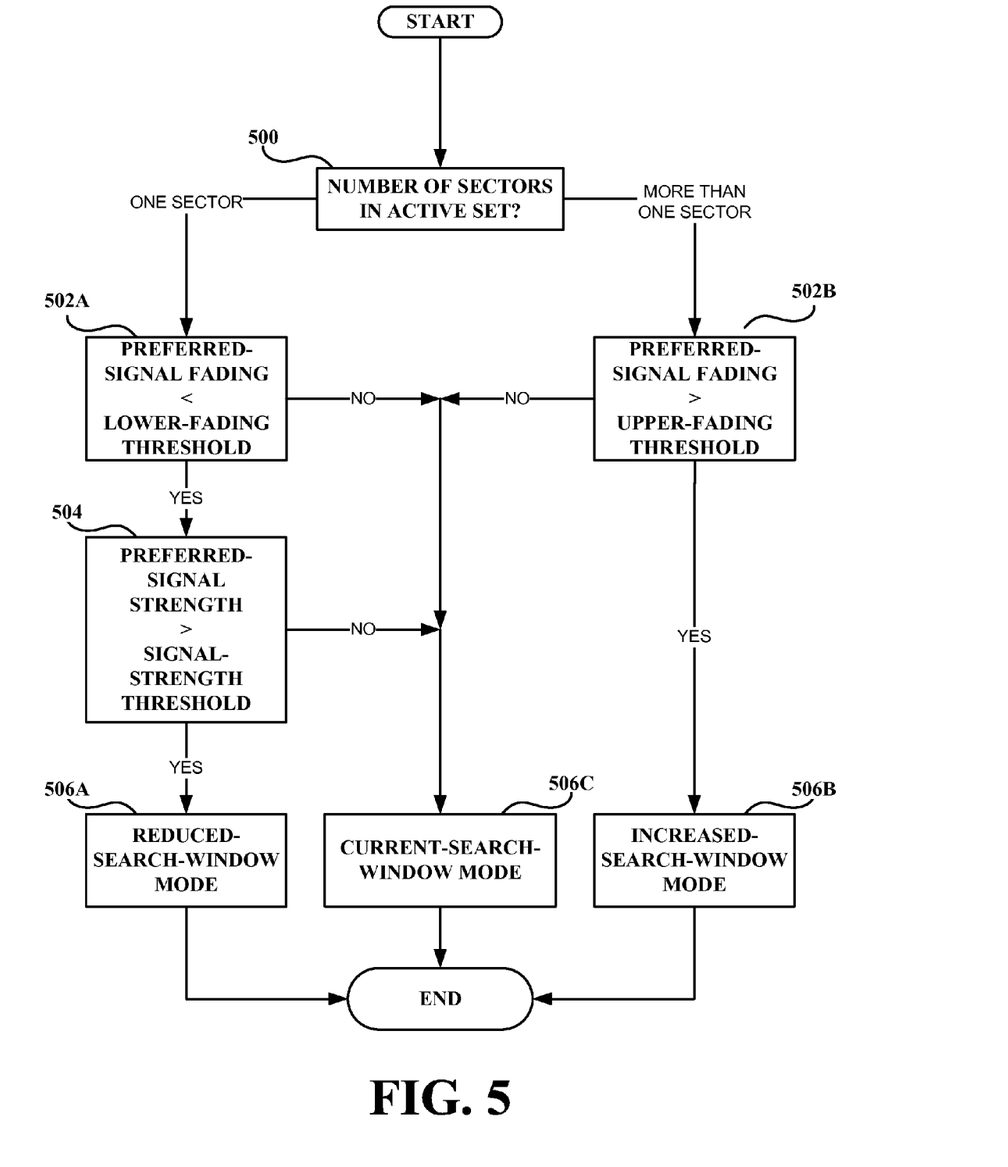
FIG. 5 is a flow chart depicting functions that can be carried out in accordance with an embodiment of the invention.

FIGS. 3-5 are flowcharts depicting a set of functions that can be carried out in accordance with an embodiment of the invention. Generally, at step 204, FIGS. 3-5 depict different embodiments of monitoring the preferred-signal strength as received at the mobile station, the preferred-signal fading of the mobile station, and the number of sectors in an active set for the mobile station to determine: (i) whether the preferred-signal strength exceeds a signal-strength threshold, (ii) whether the preferred-signal fading is (a) less than a lower-fading threshold, (b) greater than an upper-fading threshold, or (c) between the upper-fading threshold and the lower-fading threshold, and (iii) whether the number of sectors in the active set is exactly one sector or more than one sector. As further shown in FIGS. 3-5, these determinations may be conducted in various orders of operation and all three determinations are not always required to selectively operate the mobile station in any given search-window mode. Additionally, FIGS. 3-5 depict different embodiments, at step 206, of selectively operating the mobile station in one of the default-search-window mode, a reduced-search-window mode, an increased-search-window mode in response to the monitored preferred-signal strength, preferred-signal fading, and number of sectors in the active set.

In FIGS. 3-5, the MS 102 only operates in the reduced-search-window mode (306A) in response to a determination that (i) the preferred-signal strength exceeds the signal-strength threshold (302), (ii) the preferred-signal fading is less than the lower-fading threshold (300, 300A), and (iii) there is exactly one sector in the active set (304). Similarly, in FIGS. 3-5, the MS 102 only operates in the increased-search-window mode (306B) in response to a determination that (i) the preferred-signal fading is greater than the upper-fading threshold (300, 300B) and (ii) there is more than one sector in the active set (304). As such, the conditions for operating in the reduced- and increased-search-window modes will not be repeated. However, there are different ways to get to the current and default-search-window modes, which are described below.

Also in FIG. 3, the MS 102 maintains a current search-window mode (306C) in response to a determination that the preferred-signal fading is between the upper-fading threshold and the lower-fading threshold (300C). As used herein, the current search-window mode (300C) is one of the default-, reduced-, or increased-search-window modes that the MS 102 is operating in at the time a given determination is made regarding one or more of the preferred-signal strength, preferred-signal fading, and the number of sectors in the active set. Alternatively, as shown in FIG. 4, the MS 102 operates in the default-search-window mode (406C) in response to a determination that the preferred-signal fading is between the upper-fading threshold and the lower-fading threshold. This alternative embodiment is equally applicable to the functions carried out in FIGS. 3 and 5.

As shown with respect to FIG. 3, the MS 102 maintains a current search-window mode (306C) in response to a determination (i) that the preferred-signal fading is less than the lower-fading threshold (300, 300A) and (ii) that the preferred-signal strength is less than or equal to the signal-strength threshold (302). The MS 102 also maintains a current search-window mode (306C) in response to a determination (i) that the preferred-signal fading is less than the lower-fading threshold (300, 300A), (ii) that the preferred-signal strength exceeds the signal-strength threshold (302), and (iii) that there is more than one sector in the active set (304). Further, the MS 102 maintains a current search-window mode (306C) in response to a determination (i) that the preferred-signal fading is greater than the upper-fading threshold (300B) and (ii) that there is exactly one sector in the active set (304).

FIG. 4 shows that the MS 102 operates in the default-search-window mode (406C) in response to a determination (i) that the preferred-signal fading is less than the lower-fading threshold (400, 400A) and (ii) that the preferred-signal strength is less than or equal to the signal-strength threshold (402). In addition, the MS 102 operates in the default-search-window (406C) mode in response to a determination (i) that the preferred-signal fading is less than the lower-fading threshold (400, 400A), (ii) that the preferred-signal strength exceeds the signal-strength threshold (402), and (iii) that there is more than one sector in the active set (404). And the MS 102 operates in the default-search-window (406C) mode in response to a determination (i) that the preferred-signal fading is greater than the upper-fading threshold (400, 400B) and (ii) that there is exactly one sector in the active set (404).

As shown in FIG. 5, the MS 102 maintains a current search-window mode (506C) in response to a determination (i) that there is exactly one sector in the active set (500) and (ii) that the preferred-signal fading is greater than the lower-fading threshold (502A). The MS 102 similarly maintains a current search-window mode (506C) in response to a determination (i) that there is exactly one sector in the active set (500), (ii) that the preferred-signal fading is less than the lower-fading threshold (502A), and (iii) the preferred-signal strength is less than or equal to the signal-strength threshold (504). And the MS 102 maintains a current search-window mode (506C) in response to a determination (i) that there more than one sector in the active set (500) and (ii) that the preferred-signal fading is less than the upper-fading threshold (502B).

The determinations related to the monitored preferred-signal strength, preferred-signal fading, and the number of sectors in the active set have been described as occurring in particular orders as examples only. Any suitable order for any implementation is contemplated.

3. Conclusion

Various exemplary embodiments have been described above. Those skilled in the art will understand, however, that changes and modifications may be made to those examples without departing from the scope of the claims.

We claim:

1. A method for dynamically adjusting a search-window size for a mobile station, the method comprising:
    entering an active-call state and responsively initially operating the mobile station according to a default-search-window mode;
    monitoring a preferred-signal strength as received at the mobile station, a preferred-signal fading of the mobile station, and a number of sectors in an active set for the mobile station to:
        (i) compare the preferred-signal strength to a signal-strength threshold,
        (ii) compare the preferred-signal fading to at least one of a lower-fading threshold and an upper-fading threshold, and
        (iii) determine whether the number of sectors in the active set is exactly one sector or more than one sector; and
    selectively operating the mobile station in one of the default-search-window mode, a reduced-search-window mode, and an increased-search-window mode in response to the monitored preferred-signal strength, preferred-signal fading, and number of sectors in the active set,
    wherein the default-search-window mode comprises operating with a default-search-window size,
    wherein the reduced-search-window mode comprises operating with a reduced-search-window size that is less than the default-search-window size, and wherein the reduced-search-window mode is employed in response to a determination that (i) the preferred-signal strength exceeds the signal-strength threshold, (ii) the preferred-signal fading is less than the lower-fading threshold, and (iii) there is exactly one sector in the active set, and
    wherein the increased-search-window mode comprises operating with an increased-search-window size that is greater than the default-search-window size, and wherein the increased-search-window mode is employed in response to a determination that (i) the preferred-signal fading is greater than the upper-fading threshold and (ii) there is more than one sector in the active set.

2. The method of claim 1, further comprising operating the mobile station in the default-search-window mode in response to a determination that the preferred-signal fading is between the upper-fading threshold and the lower-fading threshold.

3. The method of claim 1, further comprising maintaining a current search-window mode in response to a determination that the preferred-signal fading is between the upper-fading threshold and the lower-fading threshold.

4. The method of claim 1, further comprising maintaining a current search-window mode in response to a determination (i) that the preferred-signal fading is less than the lower-fading threshold and (ii) that the preferred-signal strength is less than or equal to the signal-strength threshold.

5. The method of claim 1, further comprising maintaining a current search-window mode in response to a determination (i) that the preferred-signal fading is less than the lower-fading threshold, (ii) that the preferred-signal strength exceeds the signal-strength threshold, and (iii) that there is more than one sector in the active set.

6. The method of claim 1, further comprising maintaining a current search-window mode in response to a determination (i) that the preferred-signal fading is greater than the upper-fading threshold and (ii) that there is exactly one sector in the active set.

7. The method of claim 1, further comprising operating the mobile station in the default-search-window mode in response to a determination (i) that the preferred-signal fading is less than the lower-fading threshold and (ii) that the preferred-signal strength is less than or equal to the signal-strength threshold.

8. The method of claim 1, further comprising operating the mobile station in the default-search-window mode in response to a determination (i) that the preferred-signal fading is less than the lower-fading threshold, (ii) that the preferred-signal strength exceeds the signal-strength threshold, and (iii) that there is more than one sector in the active set.

9. The method of claim 1, further comprising operating the mobile station in the default-search-window mode in response to a determination (i) that the preferred-signal fading is greater than the upper-fading threshold and (ii) that there is exactly one sector in the active set.

10. The method of claim 1, further comprising maintaining a current search-window mode in response to a determination (i) that there is exactly one sector in the active set and (ii) that the preferred-signal fading is greater than the lower-fading threshold.

11. The method of claim 1, further comprising maintaining a current search-window mode in response to a determination (i) that there is exactly one sector in the active set, (ii) that the preferred-signal fading is less than the lower-fading threshold, and (iii) the preferred-signal strength is less than or equal to the signal-strength threshold.

12. The method of claim 1, further comprising maintaining a current search-window mode in response to a determination (i) that there more than one sector in the active set and (ii) that the preferred-signal fading is less than the upper-fading threshold.

13. The method of claim 1, carried out by a mobile station.

14. The method of claim 13, further comprising operating the mobile station in the default-search-window mode in response to a determination that the preferred-signal fading is between the upper-fading threshold and the lower-fading threshold.

15. The method of claim 13, further comprising maintaining a current search-window mode in response to a determination that the preferred-signal fading is between the upper-fading threshold and the lower-fading threshold.

16. The method of claim 13, further comprising maintaining a current search-window mode in response to a determination (i) that the preferred-signal fading is less than the lower-fading threshold and (ii) that the preferred-signal strength is less than or equal to the signal-strength threshold.

17. The method of claim 13, further comprising maintaining a current search-window mode in response to a determination (i) that the preferred-signal fading is less than the lower-fading threshold, (ii) that the preferred-signal strength exceeds the signal-strength threshold, and (iii) that there is more than one sector in the active set.

18. The method of claim 13, further comprising maintaining a current search-window mode in response to a determination (i) that the preferred-signal fading is greater than the upper-fading threshold and (ii) that there is more than one sector in the active set.

19. The method of claim 13, further comprising operating the mobile station in the default-search-window mode in response to a determination (i) that the preferred-signal fading is less than the lower-fading threshold and (ii) that the preferred-signal strength is less than or equal to the signal-strength threshold.

20. A mobile station capable of dynamically adjusting a search-window size for a mobile station, the mobile station comprising:
   a wireless-communication interface;
   a processor; and
   data storage containing program instructions executable by the processor for:
      entering an active-call state and responsively initially operating the mobile station according to a default-search-window mode;
      monitoring a preferred-signal strength as received at the mobile station, a preferred-signal fading of the mobile station, and a number of sectors in an active set for the mobile station to:
         (i) compare the preferred-signal strength to a signal-strength threshold,
         (ii) compare the preferred-signal fading to at least one of a lower-fading threshold and an upper-fading threshold, and
         (iii) determine whether the number of sectors in the active set is exactly one sector or more than one sector; and
      selectively operating the mobile station in one of the default-search-window mode, a reduced-search-window mode, and an increased-search-window mode in response to the monitored preferred-signal strength, preferred-signal fading, and number of sectors in the active set,
   wherein the default-search-window mode comprises operating with a default-search-window size,
   wherein the reduced-search-window mode comprises operating with a reduced-search-window size that is less than the default-search-window size, and wherein the reduced-search-window mode is employed in response to a determination that (i) the preferred-signal strength exceeds the signal-strength threshold, (ii) the preferred-signal fading is less than the lower-fading threshold, and (iii) there is exactly one sector in the active set, and
   wherein the increased-search-window mode comprises operating with an increased-search-window size that is greater than the default-search-window size, and wherein the increased-search-window mode is employed in response to a determination that (i) the preferred-signal fading is greater than the upper-fading threshold and (ii) there is more than one sector in the active set.

* * * * *